US007778773B2

(12) United States Patent
Yaqub et al.

(10) Patent No.: US 7,778,773 B2
(45) Date of Patent: Aug. 17, 2010

(54) OPTIMUM ROUTE PLANNING FOR SERVICE VEHICLES

(75) Inventors: Raziq Yaqub, Stewartsville, NJ (US); Victor Fajardo, Robbinsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 495 days.

(21) Appl. No.: 11/743,261

(22) Filed: May 2, 2007

(65) Prior Publication Data

US 2008/0275643 A1 Nov. 6, 2008

(51) Int. Cl.
*G01C 21/30* (2006.01)

(52) U.S. Cl. .................. 701/209; 701/202; 701/210; 701/211; 340/995.19; 342/357.09

(58) Field of Classification Search .................. 701/200, 701/201, 208–211, 214–215, 300; 342/357.1, 342/357.06, 357.07, 357.09; 705/1, 28; 340/995.19
See application file for complete search history.

(56) References Cited

U.S. PATENT DOCUMENTS

| 6,334,089 | B2 | 12/2001 | Hessing |
| 6,401,078 | B1 | 6/2002 | Roberts et al. |
| 6,745,123 | B1 | 6/2004 | Petzold |
| 2002/0152018 | A1 | 10/2002 | Duckeck |
| 2004/0073448 | A1* | 4/2004 | Barts et al. ..................... 705/1 |
| 2005/0187707 | A1 | 8/2005 | Yokota et al. |
| 2008/0077317 | A1* | 3/2008 | Zabel et al. ................. 701/201 |

FOREIGN PATENT DOCUMENTS

EP    0 814 448    12/1997

OTHER PUBLICATIONS

International Search Report, Sep. 29, 2008, pp. 1-3.

* cited by examiner

*Primary Examiner*—Gertrude Arthur Jeanglaud
(74) *Attorney, Agent, or Firm*—Watchstone P&D, PLLC

(57) ABSTRACT

Transportation costs are minimized with a novel system for optimizing a route for a service vehicle, for example, a package delivery van. Based upon static and dynamic information, a computer on board the service vehicle determines an optimum route for the vehicle to travel between multiple locations. The computer on board the service vehicle communicates wirelessly to receive any pertinent dynamic information which has changed (e.g., traffic congestion, the presence of a customer at a deliver location, or a modification of location). The computer then recalculates the optimum route for the vehicle and guides the driver of the vehicle in accordance with the newly determined optimum route. The on board computer continues to check for any updates, and recalculates the optimum route throughout the day. Thus, the optimum route may be selected based upon the latest available information white avoiding heavy signal traffic on the wireless network.

26 Claims, 2 Drawing Sheets

OPTIMUM ROUTE PLANNING FOR SERVICE VEHICLES

BACKGROUND

1. Field of the Invention

The present invention relates to a method and apparatus for optimizing route planning for vehicles. The invention is especially useful in reducing costs associated the "last mile" of a deliverable, although not limited to such use.

2. Background Discussion

In business and as is used in this disclosure, the "last mile" refers to the process of getting a deliverable (a service or product, e.g.) to a final customer or consumer (e.g. a package from a distribution center to a customer). In this context, the "last mile" does not refer to the last 5,280 feet traveled by the deliverable—the "last mile" of the deliverable may be significantly more or less than a mile. According to the Council of Logistics Management, in average, 28 percent of transportation costs are incurred in this so-called last mile, which greatly impacts a company's bottom line. The last mile is also a major concern to businesses as it strongly influences a customer's perception of a company. Because the last mile includes the final point of contact with customers, it greatly affects a customer's brand loyalty based on that customer's good or bad experience.

To improve the efficiency of last mile delivery, numerous conflicting constraints are involved, e.g., congestion on roads, delivery time requirements for different categories of mail, such as priority post, varying customer needs, real time notification to pick up a packet for upstream while engaged in downstream delivery, and so on. Though a flood of new technologies and services have cropped up in the past 10 years promising to streamline companies' supply chains, few solutions have sufficiently addressed the last mile delivery problem. Given the performance efficiency expected by the customers, versus cost-sensitiveness of the last mile, delivery agencies are quite logically seeking ways to reduce costs precisely at the distribution end. Thus there is a need to search for efficient delivery methods, rendering lower delivery costs, minimum delivery time, employing less number of carriers, and yet offer better service to customers.

Planning an optimum route for travel from an initial location (e.g. a distribution center) to multiple customer locations is an important aspect to reducing costs associated with the last mile. Some businesses where such optimum route planning is pertinent include postal delivery businesses (UPS, USPS, FedEx, DHL etc), other delivery businesses (e.g. Web-Van, Sameday.com, for web orders, online grocery delivery, pizza delivery, etc), supply chain management companies, as well as businesses needing to visit multiple customers for solely service and/or sales purposes (e.g., a cable service company).

Many navigation systems for planning an optimum route between locations base calculations solely on static information, for example start and ending points provided by a user, and a database with road map information (fixed on a CD in the vehicle). Such systems are useful for providing directions, but are inadequate for optimizing route travel for many businesses desiring to reduce costs associated with the last mite. Many of these navigation systems do not have an optimum route planning algorithm capable of determining the optimum order of traveling to multiple desired locations, and instead can only choose the route between two locations (the starting location and the ending location). Further, since the route is calculated based on static information (the map information fixed on a CD e.g.), changes which may have occurred to such information (traffic patterns, e.g.) cannot be taken into account when planning the optimum route.

Systems for planning an optimum route using updated information are known. U.S. Pat. No. 6,745,123 relates to a method and a device for transmitting navigation information from a data processing center to an on-board navigation system. The updated navigation information may include information pertaining to, e.g., addition of a new road in the road network infrastructure, road closings due to constructions, parking services, general urban information, and availability of a new restaurants/hotels. Thus because the user receives updates over the air, it reduces the need to replace the entire storage medium (e.g., a purchase of a new CD ROM with an updated digital map).

U.S. Pat. No. 6,028,553 refers to a self-sufficient navigation system in combination with a GSM interface via which a current route can be requested. The self-sufficient navigation system can calculate the route to the desired destination, purely self-sufficiently on the basis of the static data on board. A presumed position at a time of an anticipated reply is transmitted to a central with an inquiry via a mobile radiotelephone network. The central can then check whether it is possible to travel over the indicated path segment. When the central finds that it is not possible to travel over the planned path segments, it calculates the route and a route recommendation is output to the vehicle as data. This is generally a sequence of path segments. Since the method involves transmitting a route's navigation information, it may have the disadvantage that very large volumes of data may be required to be transmitted, congesting a wireless network and incurring associated high wireless service fees.

U.S. Pat. No. 6,334,089 describes a vehicle-based navigation system located in a vehicle, and a central server located outside of the vehicle. The navigation system includes an input device by which at least one destination is input thereto, the central server includes means for determining a route or the vehicle from the at least one destination and means for transmitting the route determined from the at least one destination piecewise to the navigation system. Since the system also involves transmitting a route's navigation information, a large amount of data should be transferred, congesting a wireless network, resulting in high wireless service fees.

In United States Application 20020152018 relates to the problem of congesting wireless networks due to transmission of route information to the vehicle from a control center. Data required for optimized route planning, which must be transmitted from a traffic control center to a motor vehicle navigation system, is reduced to a lesser amount. Essentially only the information necessary for driving an alternative section of the original route is transmitted from a traffic control center to the vehicle navigation system. This information represents only deviations from the route calculated in the vehicle navigation system.

However, the navigation systems noted above are not suitable for many service vehicles as there is no ability of the navigations systems to determine the order of multiple destinations to obtain an optimum route between all of the desired destinations. Further, there is no mechanism taught to dynamically alter the destinations. Finally, there is a concern of congesting wireless networks in the communication of route data from a control center to the vehicle.

SUMMARY

The present invention overcomes the various limitations and deficiencies in the background art. An optimized geographical route between multiple destinations is determined on board a service vehicle. According to some embodiments, the optimum route is determined based upon static information and dynamic information which has been received wirelessly. The route is optimized to enhance distribution efficiency and reduce costs associated with last mile delivery, while reducing use of the wireless network.

According to some embodiments, a deliverer will scan deliverables at a point of origin so as to effectively enter Static Information (SI) into a database of an on board server (OBS) from, e.g., labels of packages or the like. In some embodiments, Static Information can include, e.g.:

1. Addressee Information (e.g., Name, Phone Number, email address and/or a Proxy's Name, Phone Number, etc., in cases where an addressee is absent);
2. Delivery Destination Information (e.g., Postal Address);
3. Delivery Requirements (e.g., priority mail, regular, signature required, signature not required/drop at door step, time of delivery, etc.).

According to some embodiments, the on board server is also made capable of receiving Dynamic Information (DI), such as, e.g.:

4. Real time traffic congestion information on all the routes that correspond to the entered destinations,
5. Real time presence information of the addressees/proxies at the addressed destinations: and
6. Real time feedback received from the addressee/proxy in response to the automatic SMS query pertaining to delivery options (e.g., alternate delivery address requested by the addressee corresponding to his real time present position, alternate time requested by the addressee, care of address, etc.)

In some preferred embodiments, information pertaining to parameters (4), by way of example, noted above will be received from a Control Center Server (CCS) and/or from other meshed OBSs belonging to a fleet (such as, e.g., of the same operator using state of the art wireless technologies). In some preferred embodiments, information pertaining to parameter (5), by way of example, noted above will be received from, e.g., a 3GPP Presence Server through CCS, and information pertaining to parameter (6), by way of example, noted above will be received by an OBS via a direct automatic interaction with the addressee by sending and receiving, e.g., a Query/Response in an automatic pre-formatted text, requiring the addressee/recipient's response in a Binary format.

In preferred embodiments, making use of above noted information, an Optimum Route Planning Algorithm (ORPA) (such as, by way of example, based on Ant Colony Optimization and Dijkstra algorithms) will be executed in the OBS that would enable the OBS to plan and specify an optimized route involving all destinations prioritized in a manner that would meet the criteria set by parameters 1, 2, 3, 4, 5, and 6 above. In some embodiments, the output of the OBS will be informed to a Car (or other vehicle) Navigation System (CNS). Preferably, the CNS will guide the deliverer with driving directions (such as, e.g., according to existing state of art global positioning systems (GPS)) enabling him to deliver packages one by one in a sequential manner.

Among other things, because the route planning can be done by an electronic server taking into account several variables pertaining to SI and DI, compared to human planning, it would be efficient and thus cost effective. Furthermore, since the route planning and navigational computations can be done by an on board server (OBS), it can avoid heavy signaling burdens on, e.g., a wireless network.

In some embodiments, the Optimum Route Planning Algorithm (ORPA) can be performed before leaving a point of origin. Then, during transmit, as the situation changes, such as, e.g., due to changes in dynamic information or dynamic changes in information, the algorithm can be recalculated with a new point of origin considered (e.g., based on the then present position of the vehicle).

In some embodiments, the dynamic information can include information that changes during delivery (such as, e.g., while driving along a delivery route). By way of example, dynamic information can, thus, include a) congestion information (e.g., real-time congestion of traffic along a route), b) weather conditions (e.g., providing route recommendations based on weather conditions), c) information from other peers (e.g., information provided by other peers during driving along a route), d) information related to a job handover and/or interaction with a peer during driving along a route (e.g., whereby deliverers can potentially collaborate during delivery, such as, e.g., to effect a job-handover (such as, e.g., to pass over a package to another vehicle during transmit), such as, e.g., to effect an optimization between plural vehicles concurrently), e) vehicle performance (e.g., fuel efficiencies, driving performance (e.g., sliding of vehicle detected during delivery [e.g., to automatically recalculate a safer route], weight loads and/or other vehicle conditions), f) changes in requests related to deliveries, such as, e.g., customer's calling in for different items for delivery, new orders, cancellation of orders or the like.

In some embodiments, the optimization can be performed so as to optimize, e.g., a) time (such as, e.g., to select a route that minimizes an overall time of delivery, or alternatively such as, e.g., to select a route that minimizes deviations from estimated delivery times at respective destinations or the like), b) distance (such as, e.g., to minimize distances traveled via vehicles); and/or c) costs (such as, e.g., taking into account a variety of costs, such as, e.g., wear and tear on vehicles, fuel efficiencies, costs for operators of vehicles, costs for hours of operations, costs for late deliveries, etc.).

In some preferred embodiments, the algorithm employed can include a forecasting functionality. In this regard, the algorithm can provide, e.g., an optimization including forecasting based on prior examples. For instance, a database can includes e.g., delivery times stored in the database based on similarities of circumstance (e.g., same product delivered, same destination, same time of day and/or the like), such that an estimation of time or the like can be taken into consideration and a determination of a probability based on past experience and data can be achieved. By way of example, in some examples, presence information can be calculated based on probability (e.g., such as, e.g., if on many prior occasions a customer was not present for deliveries).

In some of the preferred embodiments, systems and methods described herein can be advantageously employed in the contexts of, e.g., delivery or providing of a) services and/or b) goods, such as, e.g., for i) package deliveries (e.g., FEDEX: UPS, etc.), ii) commercial deliveries (e.g., store deliveries [e.g., department store deliveries], food deliveries [e.g., pizza deliveries], passenger deliveries [e.g., taxi drop off of plural passengers], newspaper deliveries, routes of repair and/or other service vehicles [such as, e.g., HVAC repairmen, lawn services, plumbing services, etc.].

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The attached drawings show illustrative embodiments of the invention, in which.

DETAILED DESCRIPTION OF THE PREFERRED EMBODIMENTS

While the present invention may be embodied in many different forms, a number of illustrative embodiments are described with the understanding that the present disclosure is to be considered as providing examples of the principles of the various inventions described herein and that such examples are not intended to limit the invention to preferred embodiments described herein and/or illustrated herein.

As used in this disclosure, "services" include the pickup and delivery of products (e.g., packages and/or mail), services which do not provide a product, and salesperson related activities. Further examples of "services" include delivery and pickup of packages, groceries, etc, (e.g., UPS [e.g., packages and mail], FEDEX [e.g., packages and mail], PEAPOD [e.g., groceries]), providing car repair and/or towing services, sales of brokerage services, cable television services, and a doctor/nurses/pharmaceutical services to patients to name a few. A "service vehicle" generically refers to any vehicle used to provide services. As used in this disclosure, "delivery" and "deliverable" may refer to delivery of services, and does not necessarily require (although includes) delivery of a physical product (e.g., a doctor may deliver her services of a checkup of a patient).

Figure 1:
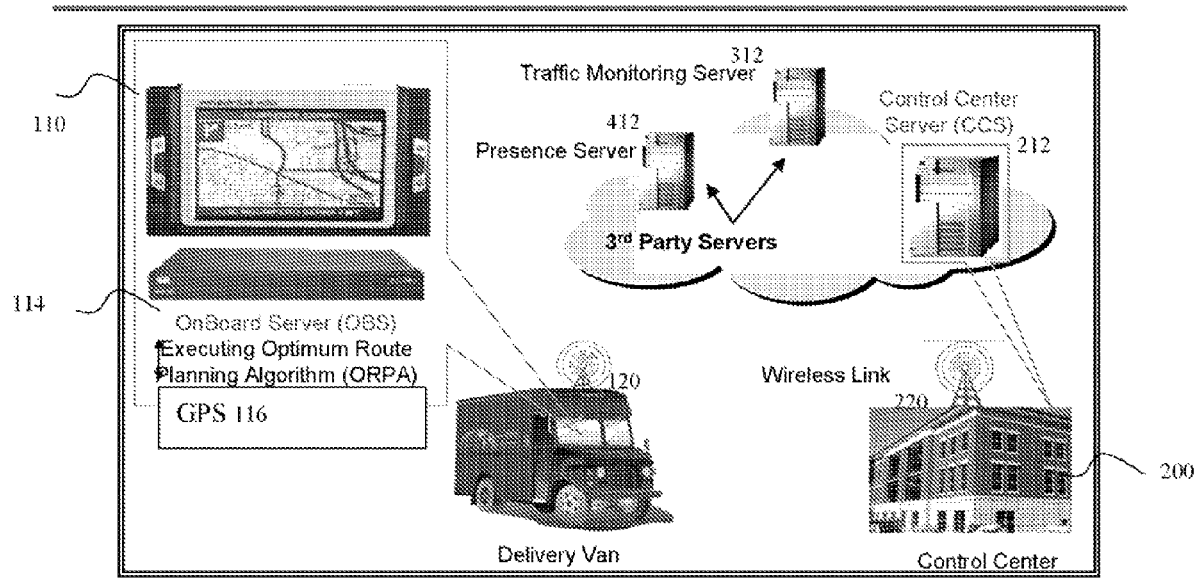
FIG. 1 is an architectural diagram in some embodiments.

Details of one embodiment of the invention will now be described with respect to FIG. 1. In this example, a service vehicle is a delivery van 100: including a navigation system 110 and a wireless communication system 120. The navigation system 110 includes an on-board server 112 and a user interface 114 for inputting and outputting information from and to the user. Here the user interface 114 is represented by a display, but may also include a keyboard, mouse, scanner, microphone etc. for input of information, as well as a speaker for voice communications with a user. On-board server 112 includes hardware and software for executing an optimum route planning algorithm. The on-board server 112 communicates with GPS 116 (global positioning system) hardware to determine the location of the vehicle (although the GPS 116 can be integral with the on-board server 112). The on-board server 112 is communicatively connected to wireless communication system 120 to receive information transmitted wirelessly and to send information wirelessly outside of the delivery van 100.

A control center 200 includes a control center server 212 and a wireless communication system 220. The control center server 212 may communicate with third party servers, such as traffic monitoring server 312 and presence server 412, over the internet, for example. The control center server 212 may also communicate with the on-board server 112 wirelessly via wireless communication systems 120 and 220.

On-Board Server

The on-board server 112 is capable of determining the optimum route based on several sources of information. The on-board server 112 includes a database with road map information of the relevant delivery area. In addition to this static information, according to the embodiment of present invention, the deliverer will scan the deliverables at the point of origin to enter static information in the database from the labels of the packages. This information may include:

1. Addressees information (e.g., name, phone number, email address, a proxy's name, phone number and address in case the addressee is absent).
2. Delivery destination information (postal address).
3. Delivery time requirements for different categories of mail/packages (e.g. in case of FedEx Priority Overnight, the packages are guaranteed to arrive early morning, i.e. around 9 AM, FedEx Priority Standard packages are guaranteed to arrive around noon, and so on).
4. Other delivery requirements (e.g., signature required, signature not required/drop at door step).

In the preferred embodiments, the on-board server 112 is capable of wirelessly communicating with control center 200 to:

1. Obtain real time road congestion parameters. Here the control center server 212 obtains real time road congestion information from a third party's traffic monitoring server 312. In a modification of this embodiment, this road congestion information may be transmitted from other sources, such as other peer delivery vehicles.
2. Obtain real time presence information of addressees of packages. Here, the control center server 212 receives location information of an addressee from presence server 412 which is part of a third party's cellular network. The cellular network has location information due to a GPS function in the addressees' cell phone.
3. Communicate GPS parameters of the delivery van 100 in real time.
4. Update destination information modifying the multiple target destinations of the route of the delivery van, including the addition, subtraction and/or modification of destination information. In this example, the updated destination information may result from a customer placing a new order for picking up a package, canceling an order for pickup, or modifying a destination for delivery of a package. Such updated information may be entered into the control center server 212 database by an operator responding to a customer's call, or may be automatically entered via a customers access to the delivery company's interactive website.

In some illustrative examples, the on-board server 112 includes software to forecast the delivery time (based on its current location as notified by GPS 116) and send an SMS (short message service or text messaging) message to the recipients notifying them an approximated delivery time. In the event the recipient informs the delivery van 100 of his or her unavailability, the on-board server 112 acts accordingly. Specifically, after the on-board server 112 receives notification that an addressee will not be present at a delivery location during the expected delivery time, the on-board server 112 determines if the package associated with such requires a signature for proof of delivery. If so, the on-board server 112 reschedules the delivery according to the recipient's availability. If the package does not require a signature, the package may be dropped off at the appropriate address according to the predetermined route.

Alternate delivery option information may be received through SMS via a predefined format, so that the responses from the addressee may be interpreted by the on-board server 112. Numerical responses from depressing a keypad on the addressee's cell phone may be associated with some predefined alternate delivery option. For example, a customer depressing a "1" may indicated to the package delivery van to deliver the package to the addressee's home address, "2" to the customer's work address, and "3" to a proxy (e.g., a neighbor). Preferably, all of these addresses should previously input into an accessible database (erg, within the on-board server 112 or control center server 212). In a modification of this embodiment, a computer generated call may be used to automatically notify and possibly reschedule delivery. Alternatively, an operator at the control center or the vehicle driver may perform the notification and any necessary rescheduling.

Upon receiving updated information (e.g., traffic congestion, new package pickup, cancelled destination, rescheduled delivery, etc.), either from the control center 200, or directly from a customer via SMS, the on-board server 112 recalculates the optimum route using such updated information, communicates the updated route to the driver of the delivery van 100 via the user interface (preferably a display with voice commands). The driver does not need to be made aware that the route has been updated.

As will be realized, this would reduce the cost to the shipper through improved delivery density and a reduction in aborted delivery attempts, a significant benefit since it is estimated that a large percentage of U.S. households have no one home during the day. Thus on-board server 112 is capable of using available real time information and adapting/revising the planned delivery route in a way that human planner can not do.

The on-board server 112 also functions to receive and location information of the delivery van 100 from the GPS 116. The location information may be used to determine whether or not the service vehicle has visited a desired destination so that any recalculated optimum routes (due to receipt of updated information) may take this into account. The software preferably requires confirmation by the vehicle operator that a delivery has been successfully made at the desired destination. Alternatively, the use of a bar code reader or manual input by delivery personnel may be used to determine whether or not the service vehicle has visited a desired destination.

The on-board server 112 may also be capable of communicating with a peer on-board server installed on the fleet of the same operator to handover job/responsibility/package, if the delivery meet or plan to meet, or receive any other information that may be used for efficient route planning (e.g., traffic congestion information not available via the control center).

Control Center Server

In some embodiments, the control center server 212 is preferably capable of communicating with, 1. Resources which maintain/broadcast/announce real time traffic information pertaining to a local area (such as, e.g., geographical zone or area), here shown as traffic monitoring server 312. This communication may be either wireline or wireless.
2. Resources with data pertaining to the location of addressees. In this embodiment, the control center 212 communicates with presence server 412 installed in cellular operators networks and defined by 3GPP/3GPP2. This communication may be either wireline or wireless.
3. With on-board server 112, as discussed above. This communication is wireless.

The control center server can also be made capable to coordinate other last mile delivery vendors (such as, e.g., WEBVAN, KOZMO, Web delivery orders, on line grocery distributors, SAMEDAY.COM, e-tailors, etc.) who have very low volume of deliveries on any particular route, or any particular day of a week, and consequently can offer delivery service to them. This may be regarded as Inter Company Job Hand-off. This is a good business model for companies with low delivery volumes, consistent utilization within markets, and/or highly specialized delivery needs. These companies may save substantial upfront capital investment, and operating cost (employees' salaries, benefits, vehicle costs and maintenance, and insurance become a financial burden if the fleet is not utilized to capacity).

In case of Web delivery orders real-time pick-up (such as, e.g., from SHOPRITE) and delivery to the customer (without taking the consignment to the warehouse) could also be possible. It would also help the last mile distributor to use physical land space more efficiently. In this case the algorithm can also unicast/multicast its approximate arrival for pick-up.

Optimum Route Planning Algorithm

Optimum Route Planning Algorithm is executed in on-board server 112. In some illustrative and non-limiting examples, the Optimum Route Planning Algorithm uses the following data for its calculations:

1. Real time traffic and congestion information on local routes/highways. This information is transmitted to the on-board server 112 from control center server 212. In a modification of this embodiment, this information also or alternatively may be transmitted directly or indirectly from other peer delivery vehicles (directly or indirectly).
2. Delivery time requirements for different categories of mail/packages (e.g. in case of FEDEX Priority Overnight, the packages are guaranteed to arrive early morning, such as, e.g., around 9 AM, FEDEX Priority Standard packages around noon, and so on).
3. Updated destination information modifying the multiple target destinations of the route of the delivery van, including the addition, subtraction and/or modification of destination information. In this example, the updated destination information may result from a new order for picking up a package, a cancellation of an order for pickup, or a customer's modification of a destination for delivery of a package.
4. Presence information from control center server 412 via the control center server 212. Here, the control center server 212 receives location information of an addressee from the presence server 412 of a cellular network operator. In some examples, the cellular network operator can have location information due to a global positioning system (GPS) function in the addressees' cell phone.
5. Alternate delivery options. Such alternate delivery option information may be received through SMS via a predefined format, so that the responses from the addressee may be interpreted by the on-board server 212 Numerical responses from depressing a keypad on the addressee's cell phone may be associated with some predefined alternate delivery option. For example, in some illustrative examples, a customer can depress a "1" to indicate to the package delivery van to deliver the package to the addressee's home address, or a "2" to indicate delivery to the customer's work address, or a "3" to indicate delivery to a neighbor.

Figure 2:
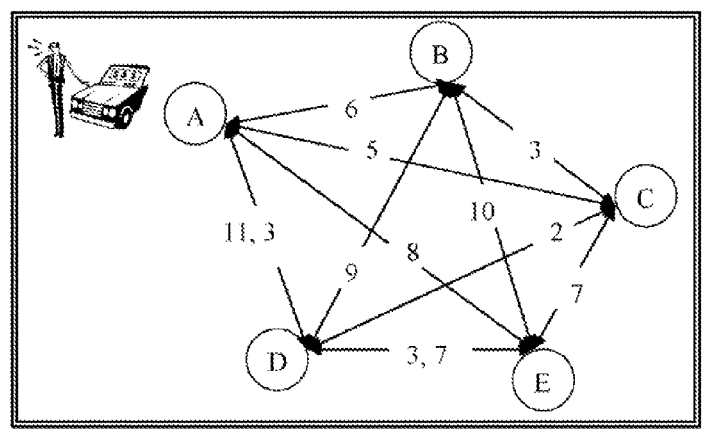
FIG. 2 is a schematic diagram showing a topology represented by a weighted graph in some embodiments.

In mathematical terms, the topology of the problem as described above can be represented by a weighted graph as shown in FIG. 2. The graph can be considered a mesh where "edges" of the graph are asymmetric. As shown in the illustrative example in FIG. 2, the weighted graph properties include vertices A, B, C, D, and E. Each vertex is connected to all other vertices via an edge, resulting here in edges A-B, A-C, A-D, A-E, B-C, B-D, B-E, C-D, C-E and D-E.

The cost of traversing an edge is notated along the edge in FIG. 2. Cost traversing and edge can be symmetric or asymmetric. Symmetric cost means the cost in traversing an edge in the forward direction is the same as the cost in traversing it in the reverse direction. Asymmetric means the forward and reverse cost are different (e.g., "11,3" and "3,7" on edges A-D and D-E respectively).

In FIG. 2, the delivery van 100 has to visit destinations B, C, D and E with a starting location at A. Each path between two vertices has an associated cost. As will be understood, the delivery van 100 has many options to which order these destinations may be visited. The order of the destinations and thus the optimum route is chosen as the route having the minimum sum of costs associated of all traversed edges of the weighted graph, corresponding to route. When moving from one location (vertex) to another, it has to traverse an edge that has an associated cost within a give direction. The goal is to visit all vertices with the least total sum cost of all traversed edges.

An additional consideration for on-board server is that the cost of an edge may change dynamically throughout the route (e.g., changing over the course of the day or the like). In reference to FIG. 2, a given algorithm can compute the optimum round-trip route from a starting point, i.e. vertex A. Such computation can take into account a prediction that a cost of an edge will change throughout the day (e.g., during rush hour, it is predicted that the costs of certain edges may increase). However, during the course of traversing the route, such as, e.g., while visiting a location along the route (vertex), the destinations the delivery van is required to visit and/or the cost of subsequent edges (forward or reverse) may differ from those used during the initial prediction (whether or not the computation predicts a variation of costs or assumes the costs are fixed). The updated information is transmitted wirelessly from the control center 200 to the delivery van 100 (via wireless systems 220 and 120). Upon receipt of this updated information, the on-board server recalculates the optimum route, excluding any destinations already visited and take into account that the starting vertex should reflect the current location of the delivery van 100 (e.g., using the current location, or using a predicted location, or only modifying the optimum route after the delivery van has reached the next vertex according to the current optimum route [which is to be updated]). Further, because many existing algorithms for the calculation of an optimum route assume the start and ending vertex are the same, an algorithm should be used which does rely on this assumption or modification of one that does.

There are many optimum route planning algorithms that may be used within the context of this invention. For example, (a) Ant Colony Optimization (ACO) Algorithm, (b) Dijkstra algorithm, and/or (c) a combination thereof may be used as Optimum Route Planning Algorithm. Further details of ACO and how it can be applied to transportation logistics can be found in "Ant Colony Optimization," by Marco Dorigo and Thomas Stuzle (see, e.g., http://www.aco-metaheuristic.org), and this entire reference is hereby incorporated herein by reference. Details of the Dijkstra algorithm can be found in, e.g., Combinatorial Optimization, Algorithms and Complexity, by Cristos H. Papadimitriou, et al. (ISBN-0-486-40258-4)(see, e.g., Chapter 6.4): the entire disclosure of which is hereby incorporated herein by reference.

Figure 3:
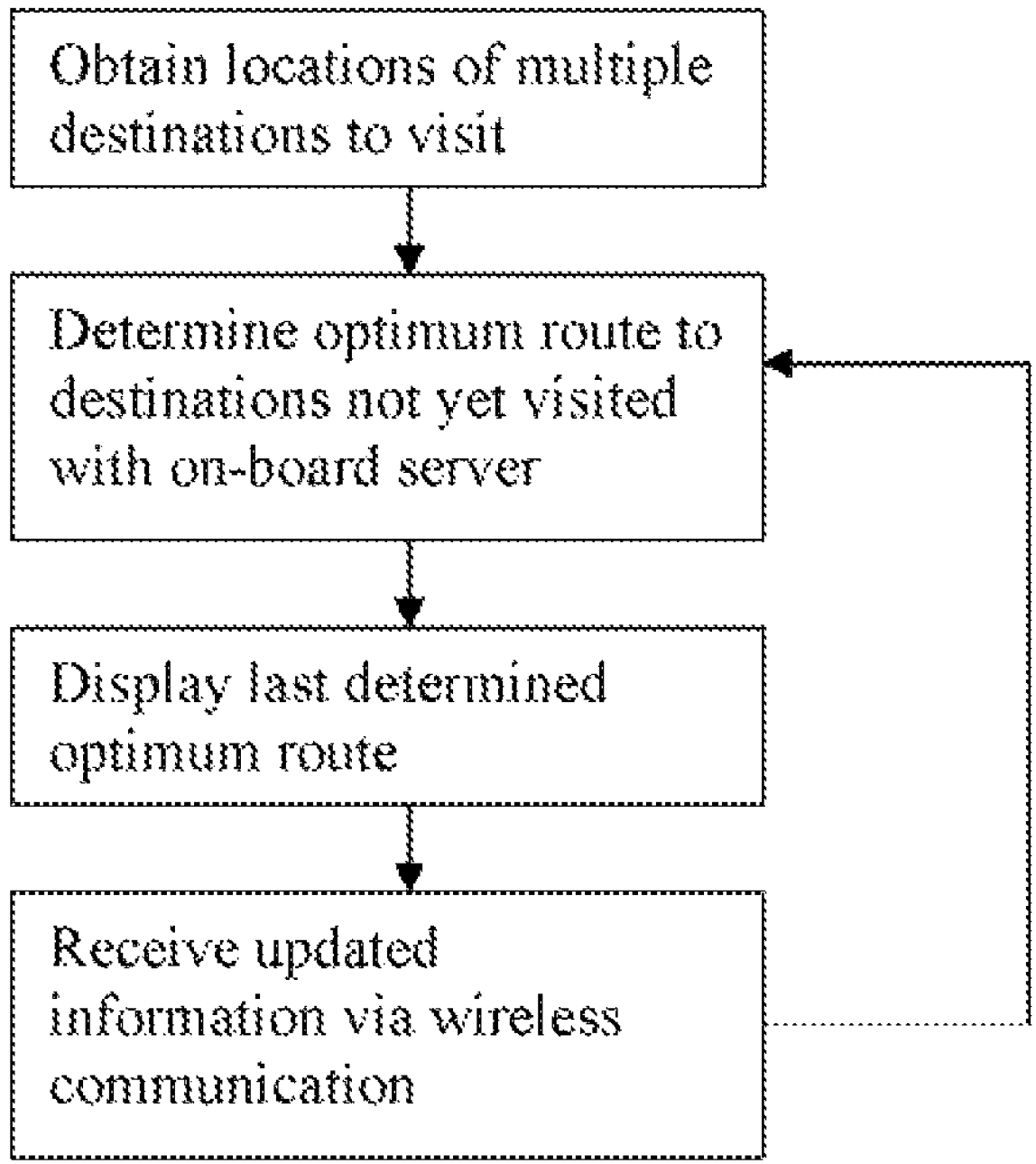
FIG. 3 is a flow diagram showing an illustrative example of a method implemented by an on board server in some embodiments.

FIG. 3 illustrates an example a method the on board server 112 preferably implements. Locations of multiple destinations are input to the on-board server 112. As noted above, this may be done with a bar-code scanner scanning packages for a package delivery service vehicle. Using road map data, the on board server then determines the optimum route, including the which order the destinations should be visited as well as the roads the vehicle should take. The optimum route is then communicated to the operator of the vehicle. The on board server 112 then receives updated information via wireless system 120. Such information may be information regarding traffic congestion or information regarding new, modified or cancelled destinations. After receipt of such updated information, the on-board server 112 re-determines the optimum route using the updated information. When re-determining the optimum route, the on-board server 112 disregards any destinations the vehicle has already visited and takes into account the updated information.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. For example, the preferred embodiment was described as including many sources of information to calculate an optimum route. However, many of these sources of information may be replaced or eliminated, or may come from other sources than those described herein. This may depend on a cost-benefit analysis to the user. Also, while this invention has particular applicability to service vehicles, the invention may also be used in a non-commercial setting. As an additional example, many of the functions described in the servers may occur in separate stand-alone systems and be communicatively coupled with the server (e.g., the GPS system and navigation systems in the delivery van may be separate stand alone systems from the on-board server, and may be part of the on-board server).

The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation; a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example." In this disclosure and during the prosecution of this application, "having" and "including" are used synonymously with "comprising"—i.e., all are considered "open ended" terms Only the phrases "consisting of" and "consisting essentially of" will be used as "close ended".

What is claimed is:

1. An optimum route planning system for a vehicle, comprising:
    an on-board computer located on board the vehicle and having access to destination information of multiple destinations to which the vehicle is to travel and road map information, the on-board computer calculating an initial optimum route the vehicle is to travel, including determining an order of the multiple destinations to which the vehicle is to travel;
    a user interface to communicate the calculated optimum route to an operator of the vehicle;
    a wireless communication system receiving updated information and communicating the same to the on-board computer;
    wherein upon receipt of the updated information, the computer again calculates an optimum route based on the destination information, the road map information and the updated information.

2. The optimum route planning system of claim 1, wherein the updated information is updated destination information modifying destinations to which the vehicle is to travel.

3. The optimum route planning system of claim 2, wherein the vehicle is a service delivery vehicle, and the updated destination information includes a new destination for a product delivery or pickup.

4. The optimum route planning system of claim 2, wherein the updated destination information includes the removal or modification of a destination from the multiple destinations of the destination information accessible to the on-board computer.

5. The optimum route planning system of claim 1, wherein the updated information is traffic congestion information.

6. The optimum route planning system of claim 1, wherein the updated information is addressee location information indicating a location of an addressee of a deliverable.

7. The optimum route planning system of claim 6, wherein the on-board computer determines whether or not the addressee location information corresponds to a desired destination of the multiple destinations, and if not, determines whether or not the destination information should be modified and a new optimum route calculated.

8. The optimum route planning system of claim 7, wherein the new optimum route calculation disregards destinations of the multiple destinations the vehicle has already visited.

9. The optimum route planning system of claim 6, wherein the addressee location information is used to modify a destination of the multiple destinations and a new optimum route is calculated as a function of the modified destination information.

10. The optimum route planning system of claim 6, wherein the location information is received wirelessly from a server at a control center.

11. The optimum route planning system of claim 6, wherein the deliverable is one of a product, mail, service, or sales.

12. The optimum route planning system of claim 1, wherein the updated information is received via a short messaging service of a cell phone and is used to modify a destination of the multiple destinations, and the computer calculates a new optimum route as a function of the modified destination.

13. The optimum route planning system of claim 1, wherein the on-board computer uses one of ant colony optimization algorithm, a Dijkstra algorithm, and a combination thereof to calculate an optimum route.

14. A method for optimizing a route for a vehicle, comprising:
    (a) obtaining initial destination information including locations of multiple destinations,
    (b) calculating, on board the vehicle, an initial optimum route between the multiple destinations, including determining an order to travel to the multiple destinations,
    (c) communicating the initial optimum route to the operator of the vehicle,
    (d) after steps (a)-(c), wirelessly receiving updated destination information,
    (e) calculating, on board the vehicle, an updated optimum route as a function of the updated destination information, and
    (f) communicating the updated optimum route to the operator of the vehicle.

15. The method of claim 14, wherein updated destination information adds a new destination to the multiple destinations and step (e) includes calculating an optimum route as a function of the new destination and the destinations of the multiple destinations the vehicle has not yet visited.

16. The method of claim 15, wherein the destinations the vehicle has not yet visited are determined automatically by using GPS information of the vehicle.

17. The method of claim 14, wherein the updated destination information is a modification of the multiple destinations and step (e) includes calculating an optimum route as a function of the modification and the destinations of the multiple destinations the vehicle has not yet visited.

18. The method of claim 17, wherein the destinations the vehicle has not yet visited are determined automatically by using GPS information of the vehicle.

19. The method of claim 14, wherein the updated destination information is a cancelled destination canceling a destination from the multiple destinations, and step (e) includes calculating an optimum route as a function of the cancelled destination and the destinations of the multiple destinations the vehicle has not yet visited.

20. The method of claim 19, wherein the destinations the vehicle has not yet visited are determined automatically by using GPS information of the vehicle.

21. The method of claim 14, wherein the updated destination information is transmitted to the vehicle from a control center.

22. The method of claim 14, wherein the updated destination information is transmitted to the vehicle from an addressee associated with the destination.

23. The method of claim 22, wherein the addressee transmits the updated destination information directly to the vehicle with a cellular phone.

24. The method of claim 22, wherein the addressee transmits the updated destination information to the vehicle via the control center.

25. The method of claim 14, wherein the updated destination information is rescheduling information indicating time restrictions of when a deliverable may be delivered.

26. The optimum route planning system of claim 2, wherein the updated destination information is rescheduling information indicating time restrictions of when a deliverable may be delivered.

* * * * *

UNITED STATES PATENT AND TRADEMARK OFFICE
CERTIFICATE OF CORRECTION

PATENT NO. : 7,778,773 B2  
APPLICATION NO. : 11/743261  
DATED : August 17, 2010  
INVENTOR(S) : Yaqub et al.

Page 1 of 2

It is certified that error appears in the above-identified patent and that said Letters Patent is hereby corrected as shown below:

On the Title Page, Item (57), under "ABSTRACT", in Column 2, Line 15, delete "white" and insert -- while --, therefor.

In the Specification

In Column 1, Line 14, delete "(e.g." and insert -- (e.g., --, therefor.

In Column 1, Line 60, delete "last mite." and insert -- last mile. --, therefor.

In Column 1, Line 67, delete "CD e.g.)," and insert -- CD, e.g.), --, therefor.

In Column 3, Line 23, delete "destinations," and insert -- destinations; --, therefor.

In Column 3, Line 25, delete "destinations:" and insert -- destinations; --, therefor.

In Column 4, Line 41, delete "includes" and insert -- include, --, therefor.

In Column 4, Line 53, delete "FEDEX:" and insert -- FEDEX, --, therefor.

In Column 4, Line 63, delete "and/for" and insert -- and/or --, therefor.

In Column 5, Line 28, delete "etc," and insert -- etc. --, therefor.

In Column 5, Line 32, delete "patients" and insert -- patients, --, therefor.

In Column 5, Line 41, delete "100:" and insert -- 100, --, therefor.

In Column 6, Line 45, delete "customers" and insert -- customer's --, therefor.

Signed and Sealed this  
Ninth Day of December, 2014

Michelle K. Lee  
*Deputy Director of the United States Patent and Trademark Office*

CERTIFICATE OF CORRECTION (continued)
U.S. Pat. No. 7,778,773 B2

In Column 7, Line 6, delete "(erg," and insert -- (e.g., --, therefor.

In Column 9, Line 62, delete "6.4):" and insert -- 6.4), --, therefor.

In Column 11, Line 2, delete "terms" and insert -- terms. --, therefor.